United States Patent
Naidoo et al.

(10) Patent No.: US 12,008,997 B2
(45) Date of Patent: Jun. 11, 2024

(54) DETERMINATION OF CONFERENCE PARTICIPANT CONTRIBUTION

(71) Applicant: Mitel Networks Corporation, Kanata (CA)

(72) Inventors: Logendra Naidoo, Ottawa (CA); Shayane Umar, Uttar Pradesh (IN); Mithu Babu, Dubai Silicon Oasis (AE)

(73) Assignee: Mitel Networks Corporation, Kanata (CA)

(*) Notice: Subject to any disclaimer, the term of this patent is extended or adjusted under 35 U.S.C. 154(b) by 190 days.

(21) Appl. No.: 17/746,487

(22) Filed: May 17, 2022

(65) Prior Publication Data
US 2023/0377582 A1 Nov. 23, 2023

(51) Int. Cl.
*G10L 17/00* (2013.01)
*G10L 15/18* (2013.01)
*H04N 7/15* (2006.01)

(52) U.S. Cl.
CPC .......... *G10L 17/00* (2013.01); *G10L 15/1815* (2013.01); *H04N 7/15* (2013.01)

(58) Field of Classification Search
CPC .. G06F 3/0486; G06F 3/1454; G06F 16/3329; G06F 16/40; G06F 16/955; G06F 40/166; G06F 3/167; G06F 9/4881; G06Q 30/0201; G06Q 30/015; G06Q 50/01; G06V 20/00; G10L 15/08; G10L 15/1815; G10L 15/26; G10L 17/00; G10L 17/04; G10L 15/22; H04L 12/1822; H04L 43/0894; H04L 41/40; H04L 65/403; H04L 67/04; H04L 67/306; H04M 1/247; H04M 3/565; H04M 3/568; H04M 3/569; H04M 2201/40; H04M 2201/50; H04N 5/445; H04N 7/15; H04N 7/157; H04N 21/422; H04N 21/42203; G06N 20/00; H04R 1/406
See application file for complete search history.

(56) References Cited

U.S. PATENT DOCUMENTS

| | | | | |
|---|---|---|---|---|
| 6,882,971 | B2 * | 4/2005 | Craner | H04M 1/247 704/250 |
| 7,617,094 | B2 * | 11/2009 | Aoki | G10L 17/00 704/214 |
| 8,150,872 | B2 * | 4/2012 | Bernard | G06F 16/40 707/723 |

(Continued)

OTHER PUBLICATIONS

Proceedings of the VLDB Endowment, vol. 3 No. 2, "Confucius and Its Intellegent Disciples: Integrating Social with Search", Copyright 2010.

*Primary Examiner* — Gerald Gauthier

(57) ABSTRACT

A conferencing system for determining a participant's status during a conference may include (1) a conference server configured to identify one or more conference topics, and (2) one or more participant devices in communication with the conference server, wherein each participant device is assigned to a unique participant. A natural language processor (NLP) may be in communication with the conference server, wherein the NLP processor is configured to identify a participant and one or more topics on which the participant comments. A ranking engine is configured to identify one or both of (a) whether the participant was an originator of an idea related to a conference topic, and (b) the participant's contribution to a conference topic.

17 Claims, 5 Drawing Sheets

(56) References Cited

U.S. PATENT DOCUMENTS

| | | | | |
|---|---|---|---|---|
| 8,463,600 | B2* | 6/2013 | Aoki | G10L 17/00 |
| | | | | 704/214 |
| 9,264,550 | B2* | 2/2016 | Kaye | H04M 3/565 |
| 9,704,488 | B2* | 7/2017 | Kashtan | G10L 17/04 |
| 10,264,214 | B1* | 4/2019 | Kumar | H04N 7/157 |
| 10,440,325 | B1* | 10/2019 | Boxwell | H04N 5/445 |
| 11,132,110 | B1* | 9/2021 | Christensen | H04N 7/15 |
| 11,184,560 | B1* | 11/2021 | Mese | G10L 17/00 |
| 11,443,740 | B1* | 9/2022 | Ravu | G06Q 30/015 |
| 11,532,306 | B2* | 12/2022 | Kim | H04R 1/406 |
| 11,551,663 | B1* | 1/2023 | Bissell | G06F 3/167 |
| 11,579,841 | B1* | 2/2023 | Eich | G06F 9/4881 |
| 2009/0112589 | A1* | 4/2009 | Hiselius | H04M 3/568 |
| | | | | 704/E17.003 |
| 2010/0106504 | A1* | 4/2010 | Agrawal | G10L 17/00 |
| | | | | 704/246 |
| 2011/0270609 | A1* | 11/2011 | Jones | G10L 15/26 |
| | | | | 704/235 |
| 2013/0198635 | A1* | 8/2013 | Jones | G06F 3/0486 |
| | | | | 715/727 |
| 2014/0006025 | A1* | 1/2014 | Krishnan | G06F 16/955 |
| | | | | 704/E15.001 |
| 2015/0199962 | A1* | 7/2015 | Han | G10L 15/08 |
| | | | | 704/237 |
| 2016/0134570 | A1* | 5/2016 | Yin | H04L 65/403 |
| | | | | 709/204 |
| 2016/0142462 | A1* | 5/2016 | Johnston | G10L 17/00 |
| | | | | 709/205 |
| 2016/0219048 | A1* | 7/2016 | Porras | H04L 41/40 |
| 2018/0075128 | A1* | 3/2018 | Srinivasan | G06Q 30/0201 |
| 2018/0293221 | A1* | 10/2018 | Finkelstein | G06N 20/00 |
| 2018/0329998 | A1* | 11/2018 | Thomson | H04N 21/42203 |
| 2019/0189117 | A1* | 6/2019 | Kumar | G06F 16/3329 |
| 2019/0341059 | A1* | 11/2019 | Ferreira Moreno | G10L 15/26 |
| 2019/0388785 | A1* | 12/2019 | Kumar | G10L 15/1815 |
| 2021/0042662 | A1* | 2/2021 | Pu | G06Q 50/01 |
| 2021/0058263 | A1* | 2/2021 | Fahrendorff | H04L 67/306 |
| 2021/0058264 | A1* | 2/2021 | Fahrendorff | H04L 12/1822 |
| 2022/0246149 | A1* | 8/2022 | Kumar | G10L 15/22 |
| 2022/0334790 | A1* | 10/2022 | Lawrence | G06F 3/1454 |
| 2022/0350954 | A1* | 11/2022 | Tumbde | G06V 20/00 |
| 2023/0033595 | A1* | 2/2023 | Shetty | G06F 40/166 |
| 2023/0146818 | A1* | 5/2023 | Kurien | H04L 43/0894 |
| | | | | 709/204 |
| 2023/0246866 | A1* | 8/2023 | Ramoutar | H04L 12/1822 |
| | | | | 709/204 |
| 2023/0269283 | A1* | 8/2023 | Chun | H04L 67/04 |
| | | | | 709/231 |
| 2023/0377582 | A1* | 11/2023 | Naidoo | G10L 15/1815 |

* cited by examiner

Participants (4)

Participant 1
Reviewing a Github website on Python for Blockchain Developers

Participant 2
No relevant activity

Participant 3
Searching on Blockchain algorithms

Participant 4
No relevant activity

FIG. 5

DETERMINATION OF CONFERENCE PARTICIPANT CONTRIBUTION

FIELD

The present disclosure relates to systems and methods for determining the participation of a conference participant during a conference.

BACKGROUND

When communicating, people tend to rely on static accounts of communication topics and participant contribution to the topics through methods that do not capture enough detail and that can introduce subjective bias.

Devices and software do not exhibit subjective bias and can objectively determine certain things about a conference participant. For example, devices and software can determine a participant's presence in a conference (also called a meeting or presentation herein), and can determine a participant's status. A participant's status may be updated dynamically, for example, "Away from Office," "Busy in a Conference," "Do Not Disturb," "In Transit," etc. These statuses, however, do not indicate whether a participant is contributing to the subject matter (also referred to as a topic) of a conference.

Updating the dynamic status of conference participants during a conference can be socially straining because it can hamper privacy (e.g., it may involve monitoring the participants' respective computer activities, which may be personal) as it determines participant status, e.g., whether the participant is at his/her desk, logged in/out of his/her primary participant device, or on a phone call, etc.

It may be necessary for conference participants to recognize which participant originated an idea versus adding that as a conference action in minutes, summarization, awards, recognition, etc. Further, adding idea originators after the conference could be a tedious manual task as participants normally describe ideas in different ways or even in different languages. Further, notetaking can result in subjective bias.

"Ownership status" is an identification of the originator of a new idea/topic in a live (in-person, or by phone, or video) or recorded conference. Ownership status is largely a subjective understanding of a participant's input during a conference to know whether a participant is the originator of an idea. For example, if one participant speaks more in depth on an idea, that participant may not necessarily be the originator even though he/she has more knowledge on the idea/topic, but he/she must have obtained the idea from someone else. Even though that participant picked up the right phrase/word for the idea/topic, the originator could have been another participant who described the idea/topic in different words, or perhaps used a different language to express the idea. This can lead to unfair assessment when assigning ownership of an idea.

Speech/natural language processing (NLP) and voice recognition analytics are known to analyze the content of audio and/or to recognize a speaker. These programs have the capability of transcribing conversations and turning them into searchable data that businesses can use to gain insight into information. Identifying speakers instantly with accuracy based on the unique characteristics of the speaker's voice is known. But there is no system or method that uniquely identifies the originator of an idea, or that identifies the correct originator after a wrong idea originator was originally identified.

There is also no known system or method that provides dynamic status updates for conference participants related to the current conference topic and that develops an objective metric to determine which person used semantically similar terminology ("smart contracts" vs. "blockchain") or identical terms ("blockchain") to originate an idea.

An opportunity exists to create meaningful dynamic statuses that reflect what task a conference participant is performing during the conference and how it relates to conference topic(s). The recipients (usually other participants or the conference host/facilitator) of the status may use the updates to enhance conference effectiveness by validating the act of presenting specific subject matter related to a conference topic. Host/facilitators may even modify the conference agenda or topics based on the statuses that automatically reflect what participants are doing and how they are reacting to the conference content, for example, "Participant X is searching online for the topic "What is a Gantt chart?"

BRIEF DESCRIPTION OF THE DRAWING FIGURES

The subject matter of the present disclosure is particularly pointed out and distinctly claimed in the concluding portion of the specification. A more complete understanding of the present disclosure, however, may best be obtained by referring to the detailed description and claims when considered in connection with the drawing figures, wherein like numerals denote like elements and wherein:

FIG. 5 illustrates an example of dynamic status using detected subject matter in accordance with exemplary embodiments of this disclosure.

Figure 1:
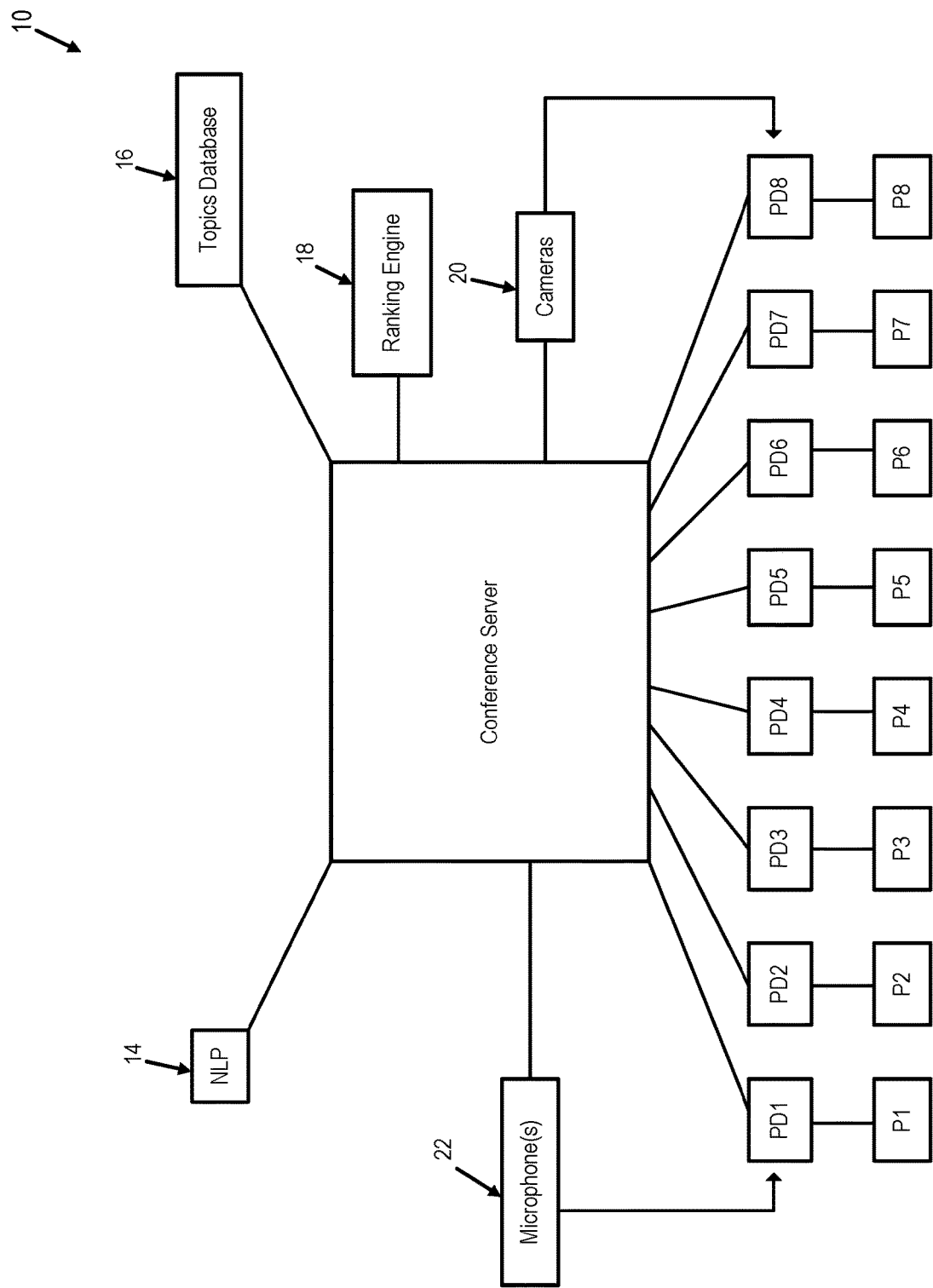
FIG. 1 illustrates a system to determine ownership registry and participant contribution based on detected subject matter in accordance with exemplary embodiments of this disclosure.

It will be appreciated that elements in the figures are illustrated for simplicity and clarity and have not necessarily been drawn to scale. For example, the dimensions of some of the elements in the figures may be exaggerated relative to other elements to help to improve understanding of illustrated embodiments of the present invention.

DETAILED DESCRIPTION

The description of exemplary embodiments provided below is merely exemplary and is intended for purposes of illustration only; the following description is not intended to limit the scope of the claims. Moreover, recitation of multiple embodiments having stated features is not intended to exclude other embodiments having additional or fewer features or other embodiments incorporating different combinations of the stated features.

Disclosed are methods and systems to determine one or more of (a) a topic being addressed at a conference (also called a meeting or presentation), (b) the status of conference participants during the conference, (c) which conference participant was the originator of an idea related to a conference topic, and (d) a participant's qualitative and/or quantitative contribution to one or more conference topics. The methods and systems according to this disclosure and claims can operate in a premise, cloud-based, or hybrid environment, and apply to audio and audio/visual conferences provided remotely, in-person, or recorded.

The topic being addressed at a conference can be determined in a number of ways. An NLP server could analyze either the language of the conference host/facilitator and/or the language of the conference participants to determine the topic being discussed at that time. Or the conference system (10), described further below, could analyze the conference presentations materials, such as text, images, videos, page numbers, headings, and subheadings to determine the current topic, or some combination NLP and analysis of the conference materials could be utilized.

The status of a conference participant during the conference can be determined by analyzing one or more of (a) the participant's comments (utilizing NLP) during the conference, (b) email, text, or chat communications by the participant, which may include documents sent by the participant to other participants or to the host/facilitator during the conference, (c) activity on the participant's participant device (such as a computer) during the conference, and (d) indicators sent by the participant during the conference, such as "on a call" or "had to leave."

System and methods according to this disclosure should preferably identify the originator of an idea as well as inconsistencies regarding identifying the originator. NLP, or other methods, may be used to identify consistencies and contradictions in idea origination. Determining whether a participant is the originator of an idea related to a conference topic can be performed using one or more of (a) the participant's comments (utilizing NLP) during the conference, (b) email, text, or chat communications by the participant, which may include documents, sent by the participant to other participants and/or to the host/facilitator during the conference.

The stated idea originator could be written (such as in conference minutes; agendas; or presentations) and/or spoken form (host/facilitator or participant's words). When inconsistencies in origination are detected, the system/method may use any appropriate information, and one or more of the devices and methods described herein, to determine the correct idea originator.

The system and method of this disclosure analyze a participant's actions without subjective bias. They identify who originated an idea related to a topic, while (in some embodiments) filtering out mere mentions (e.g., paraphrasing) of an idea that used key terms that are false-positives (e.g., "according to the Financial Post, blockchain is harder to implement and maintain"). A participant can mention an analyzed term, but determining if that participant originated the idea or simply used the same word is resolved by the systems and methods of this disclosure. The system and method of this disclosure can analyze across multiple conferences to determine an idea originator (Day 2: "ok, we'll go with blockchain since you proposed it so eloquently"; Day 1 "I propose we look at blockchain to resolve this cyber-intrusion issue").

A participant's qualitative and/or quantitative contribution to one or more conference topics can also be determined by analyzing one or more of (a) the participant's comments (utilizing NLP) during the conference, (b) email, text, or chat communications by the participant, which may include documents sent by the participant to other participants or to the host/facilitator during the conference, and (c) activity on the participant's participant device (such as a computer) during the conference A system and method of this disclosure may include a status indicator that relates to the conference topics so that participant status updates are current and relevant. Whenever an online activity is detected that promotes interest in the conference topic being presented, the status indicator for that participant may update dynamically if it is determined to be of relevance to a conference topic. For example, dynamic status updates generated by a system or method according to this disclosure can provide relevant updates such as that a participant is researching "Blockchain Coding for Python Developers," and concurrently another conference participant is browsing GitHub for information on "What is Python?" or "Creating Smart Contracts,"

Social media status-sharing features may be relevant, or not relevant, to a conference topic, such as: "Participant X is watching Nancy Pelosi in a Live Event", "Participant X is playing Backgammon with Participant Y", etc.

This disclosure is also directed in part to deriving information from participant activities during the conference, which may be material to informing other participants and/or the host/facilitator, and to possibly altering the conference content or timing, or presenting different topics. For example, if during the conference a participant conducts online activities that are related to a conference topic, the system and method may automatically produce dynamic status updates of the participant's activities that promote that conference topic and the host/facilitator may adjust the conference topic(s) or conference organization as a result.

A system/method as disclosed herein preferably ignores participant activities that are not tied to the conference topic(s). For example, if a participant is watching a FIFA game or an irrelevant YouTube video, checking his/her Facebook, etc., and such activities are not related to a conference topic, this may not result in a dynamic status update, other than perhaps indicate that the participant is not involved in the conference topic at that time. If the participant is engaged in an unrelated activity his/her status may be updated to "irrelevant" or "off topic" or a similar designation.

Participant privacy may be protected because the disclosed system and method could uncover personal activities or communications unrelated to a conference topic. Such activities are irrelevant to any analysis other than to possibly update the participant's status or to indicate to a host/facilitator and/or other conference participants that perhaps the participant is not paying attention. Therefore, data regarding irrelevant activities may not be used or stored.

As used herein, "engine" refers to computer program instructions, encoded on computer storage medium for execution by, or to control the operation of, data processing apparatus. Alternatively or additionally, the program instructions can be encoded on an artificially-generated propagated signal, e.g., a machine-generated electrical, optical, or electromagnetic signal, which is generated to encode information for transmission to suitable receiver apparatus for execution by a data processing apparatus. A computer storage medium can be, or be included in, a computer-readable storage device, a computer-readable storage substrate, a random or serial access memory array or device, or a combination of one or more of the substrates and devices. Moreover, while a computer storage medium is not a propagated signal, a computer storage medium can be a source or destination of computer program instructions encoded in an artificially-generated propagated signal. The computer storage medium can also be, or be included in, one or more separate physical components or media (e.g., solid-state memory that forms part of a device, disks, or other storage devices). In accordance with examples of the disclosure, a non-transient computer readable medium containing program can perform functions of one or more methods, modules, engines and/or other system components as described herein.

As used herein, "database" refers to any suitable database for storing information, electronic files or code to be utilized to practice embodiments of this disclosure. As used herein, "server" refers to any suitable server, computer or computing device for performing functions utilized to practice embodiments of this disclosure.

Turning to the Figures, wherein the purpose is to describe embodiments of this disclosure and not limit the scope of the claims, FIG. 1 depicts an exemplary system (10). System (10) includes a conference server (12) that is configured to identify (a) a conference topic, (b) a participant, (c) the participant's contributions to the conference topic, including (i) the amount of activity by the participant, (ii) the relevance of the activity, (iii) the type of activity, and (c) whether participant was an originator of an idea.

A natural language processor (NLP) (14) may be a separate component or part of conference server 12 or of any other suitable part of system 10. If utilized, NLP (14) analyzes the speech of each conference participant and/or the conference host/facilitator and based on the analysis determines (a) the conference topic being, discussed, (b) the amount of contribution of each participant to the topic, (c) the quality of contribution of each participant to the topic, and (d) whether a participant is an originator of an idea.

A translator (14A) may be a separate component or be part of NLP (14) or conference server (12). Translator (14A) is configured to translate one or more languages used by the one or more participants and hosts/facilitators and provide the translation(s) to the NLP to use as described above.

A topics database (16) may be a separate component or be part of conference server (12) or any other suitable part of system (10). The topics database (16) includes the conference topics based on any suitable criteria, such as (a) the language used by the host/facilitator and/or participants, in which case topics database (16) would be in communication with NLP (14), (b) the printed material, such as text, headings, and subheadings in the conference materials, (c) images in the conference, (d) videos in the conference materials, and/or (e) the name of the host/facilitator for that portion of the conference.

A ranking engine (18) can be a separate component or be part of conference server (12) or any other suitable component of system (10). Ranking engine (18) communicates with conference server (12) and topics database (16) and determines, based on the conference topic, each participant's contribution to the topic (preferably both quantitative and qualitative) and which participants originated ideas.

One or more microphones (22) may be utilized to transmit speech from the one or more participants (P1-P8) (in this example, there are eight conference participants although there may be any number of participants) to the NLP (14). Alternatively, speech from any of participants (P1-P8) may be transmitted through microphones in a corresponding participant device (PD1-PD8).

One or more cameras (20) may be utilized with system (10). If used, the one or more cameras (20) view one or more of the participants (P1-P8) and provide information to conference server (12) regarding each participant's activity. Alternatively, if a camera is utilized, a camera an respective participant device (PD1-PD8) may be used for the associated participant.

Participant devices (PD1-PD8) are any suitable electronic communication devices, such as personal computers (PCs), smart phones, or tablets. A participant (P1-P8) may use his/her associated device (PD1-PD8) to type messages to the conference server, speak, send messages to other participants, or search the internet or social media. Each participant's activities are monitored, but preferably only those activities relating to a conference topic in order to maintain the participant's privacy.

Figure 2:
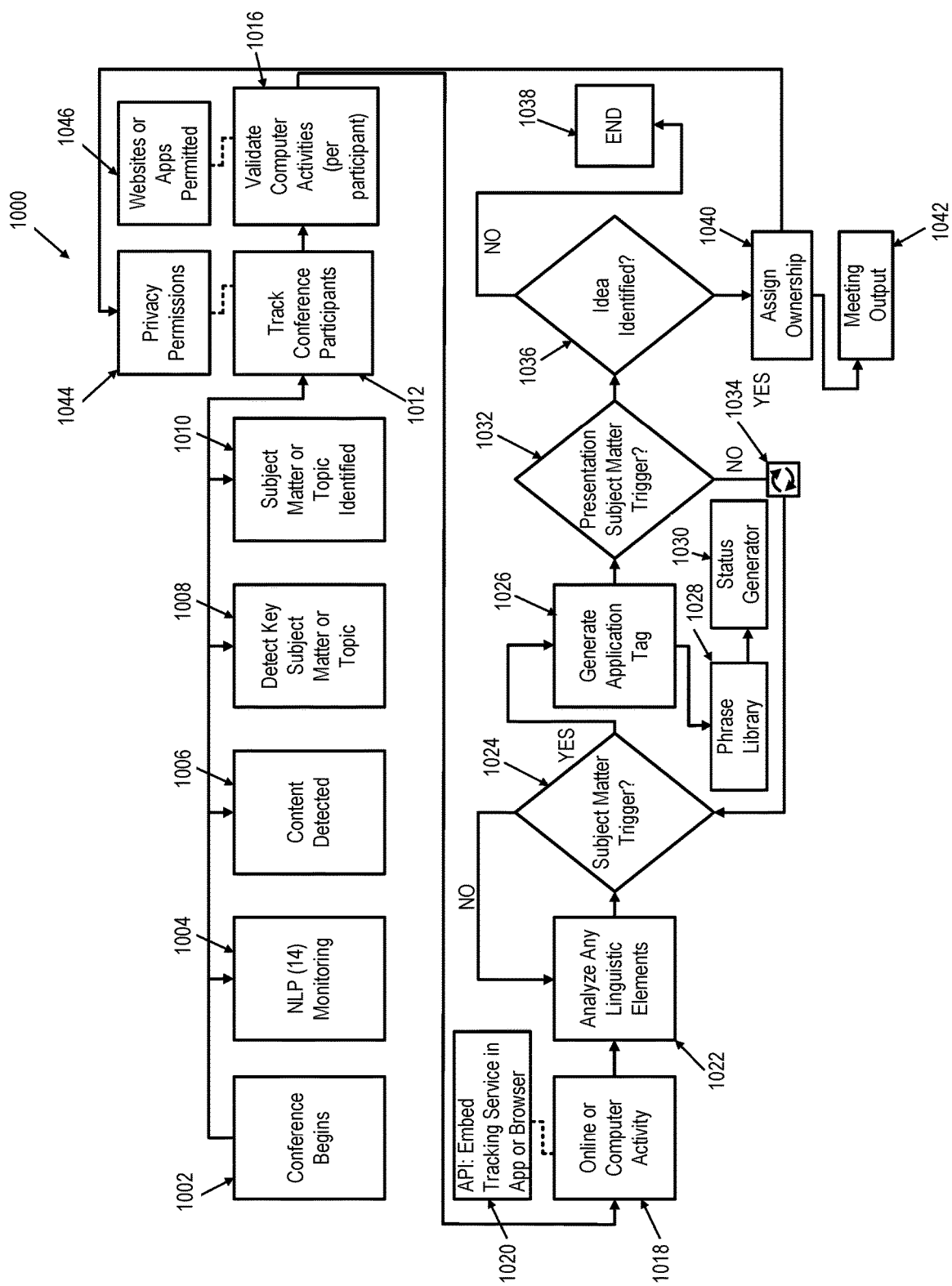
FIG. 2 illustrates a method for content detection in accordance with exemplary embodiments of this disclosure.

FIG. 2 shows an exemplary method (1000) according to an aspect of this disclosure. The method steps may be performed in any suitable order, certain steps may not be performed, and additional steps may be added. For example, a system (10) and method (1000) may only determine who was the originator of an idea or only the level of activity of one or more participants directed to a conference topic. Or the method may determine which participant was the second originator of an idea.

In step (1002) a conference begins with one or more participants and optionally a host/facilitator. Step (1004) depicts natural language processor (NLP) (14) in operation to determine themes or topics of the conference based on the language of the host/facilitator and/or of one or more participants. Alternatively, NLP monitoring may not be utilized.

At step (1006) the detected current content, or topic, of the conference is using one or more of (a) the NLP (14) monitoring, (b) the name of the featured speaker, (c) the time, and (d) information from a conference, such as text, titles, subtitles, and page numbers. At steps (1008, 1010) system (10) determines the key subject matter or topic on which the conference is focused at that time, and steps (1008, 1010) can be consolidated into a single step.

At step (1012) the system (10) may begin to track conference participants, which may be initiated by a command from the conference host/facilitator. The tracking of participants is to determine (a) which participant is or is not engaged in the conference, (b) (optionally) the level of participation of each participant related to the current conference topic, and (c) (optionally) which originated by each participant hat are relevant to a conference topic.

In this regard, a participant may originate an idea related to a conference topic even if the topic is not currently being discussed in the conference. As part of tracking conference participants (1022) system (10) may be enabled to access (1014) the computer activities of one or more participants to determine if a participant is using his/her computer and if the usage relates to a conference topic. Online or other computer activity is monitored (1018) for activity by a participant on his/her participant device. This can be accomplished by analyzing key strokes (e.g., words typed into a search engine) and websites visited, including social media sites visited. This can be accomplished through the use of an application programming interface (ARI) (1020) that is at any suitable location in system (10) and may be embedded as a tracking service in a participant's device, or in a browser available to the participant device, or via a wireless connection, such as WIFI connection.

At step (1022), linguistic elements, or websites visited, or text entered, may be analyzed to determine if there is a match (step 1024) with a conference topic, which may be the current topic or another conference topic. If there is no match, steps (1022) and (1024) are repeated. During step (1022) a participant may, for privacy reasons, have to grant permission for his/her computer activity to be monitored.

If there is a match between a participant's computer activity (step 1022) and a conference topic (step 1024), an application tag is entered (step 1026), which is transmitted to a phrase library (step 1028) and also to an analyzer to determine if there is a conference subject another trigger (step 1032). From the phrase library (step 1028) information is sent to a status generator (step 1030).

If the application tag generated at step (1026) does not trigger conference subject matter (step 1032), steps (1024) and (1022) are repeated. Optionally, during steps (1022), (1024), (1026), and (1028), system (10) may apply similarity learning and generate a library of semantically-similar words and phrases given that different participants may express comments and ideas in different ways.

If the application tag generated at step (1026) does trigger a conference topic (step 1032), the participant's activities are analyzed (step 1036) to determine if an idea is identified. If no idea is identified (step 1038) that particular inquiry ends. If an idea is identified, ownership of the idea is assigned (step 1040). Additionally, the method reverts to (step 1044) for privacy permissions (optional) to again begin tracking the activities of conference participants (step 1014).

Figure 3:
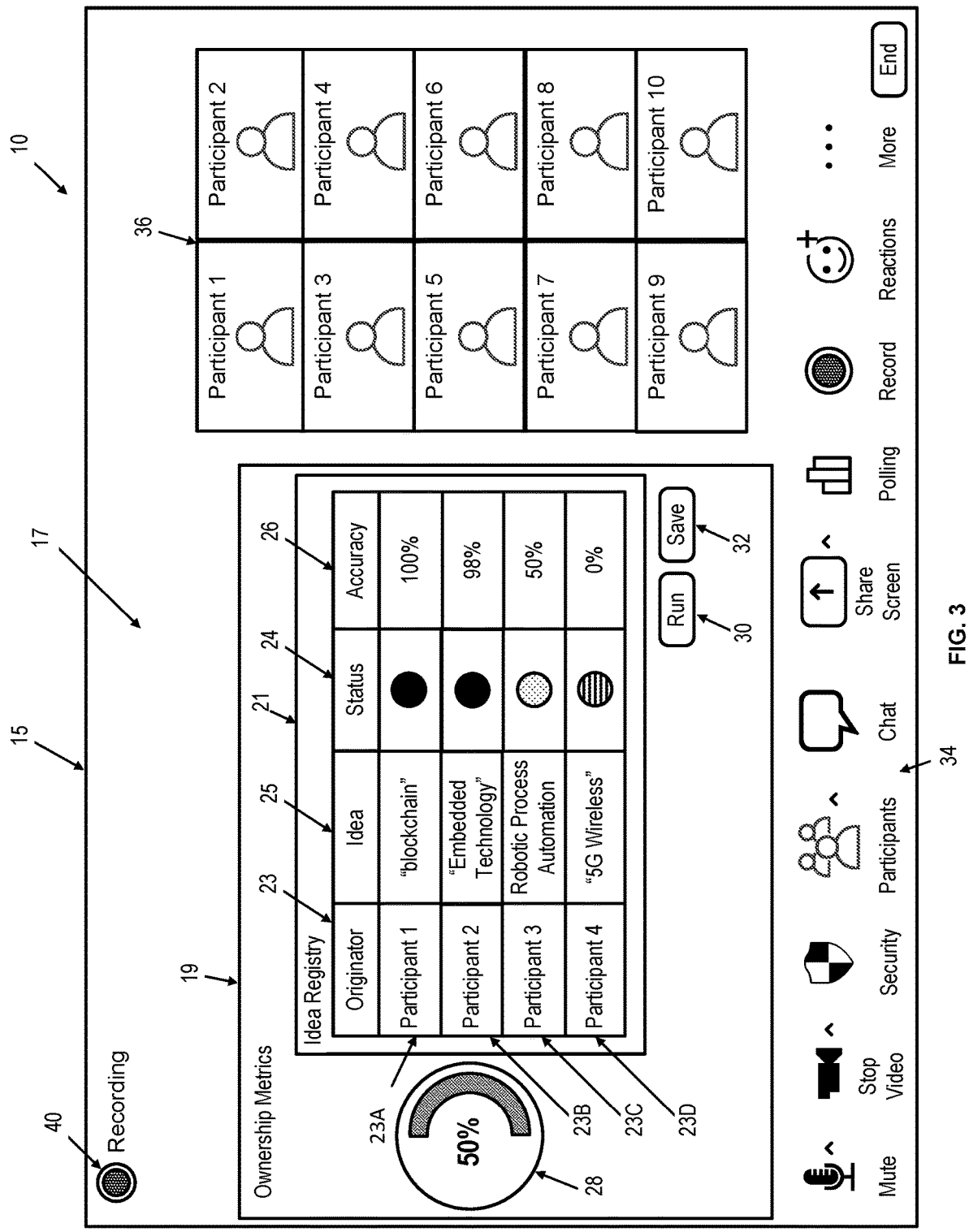
FIG. 3 illustrates a screen that can be used in accordance with exemplary embodiments of this disclosure.

Turning to FIG. 3, a representative screen (15) of a device used in accordance with this disclosure is shown. Screen (15) could be the host/facilitator screen or could be available on one or more of participant devices (PD1-PD8). Screen (15) is merely representative. More or less information may be shown on screen (15), the information may be organized differently, or screen (15) may not be used, in which case this description further defines the operation of a system and method of this disclosure.

Screen (15) is generated by conference server (12) or any suitable device. Screen (15) includes a face (17). Window 19 shows Ownership metrics, which illustrate which participant originated an idea. In this example, there are four originators 23, which are participant 1 (23A), participant (23B), participant 3 (23C), and participant 4 (23D). Column (25) shows "ideas," column (24) shows "status," and column (26) shows "accuracy."

In this example, participant 1 (23A) has been attributed as the originator of the idea of "blockchain," has a dynamic status of being actively involved in the conference topic at that time, and the system (10) has determined with 100% accuracy that participant 1 is the originator of the idea "blockchain." Participant 2 (23B) has been identified by system (10) as the originator of the idea "embedded technology." The dynamic status of participant 2 (23B) is of being actively involved with the conference topic at that time, and system (10) has determined with 98% accuracy that participant 2 (23B) is the originator of the idea of "embedded technology," perhaps because another participant used language or sent a message possibly indicating that he/she originated the idea before participant 2 (23B).

Participant 3 (23C) has been attributed as the originator of the idea "robotic process automation," has a dynamic status of being only somewhat involved, or tangentially involved, with the conference topic at that time, and the system (10) has determined with 50% accuracy that participant 3 (23C) was the originator of the idea of "robotic process information," perhaps because another participant used language or sent a message possibly indicating that he/she originated the idea before participant 3 (23C). Participant 4 (23D) has been attributed as a possible originator of the idea "5G wireless," has a dynamic status update of not being involved with the conference topic at that time, perhaps because participant 4 (23D) is on an unrelated phone call, conducting unrelated texting or internet searching, or had to leave the conference. System (10) has determined with 0% accuracy that participant 4 (23D) originated the idea of "5G wireless," because system (10) determined than another participant originated the idea.

Duration meter (28) shows the approximate percentage (in this case, 50%) of the conference time that has transpired. Run icon (30) permits a user, such as a conference host/facilitator or participant, to update the Ownership metrics window (19), although the data in window (19) preferably updates automatically as system (10) receives and analyzes more information. Save icon (32) enables a participant or the host/facilitator to save window (19) at any desired time.

Control icons (34) are standard for video conferencing applications. Window (36) shows the participants involved in the conference and in this example there are ten total participants. Recording icon (40) can be enabled to record all or part of the conference and the recording may be saved on conference server (12) and/or any of the participant devices, such as participant devices (P1-P10).

Figure 4:
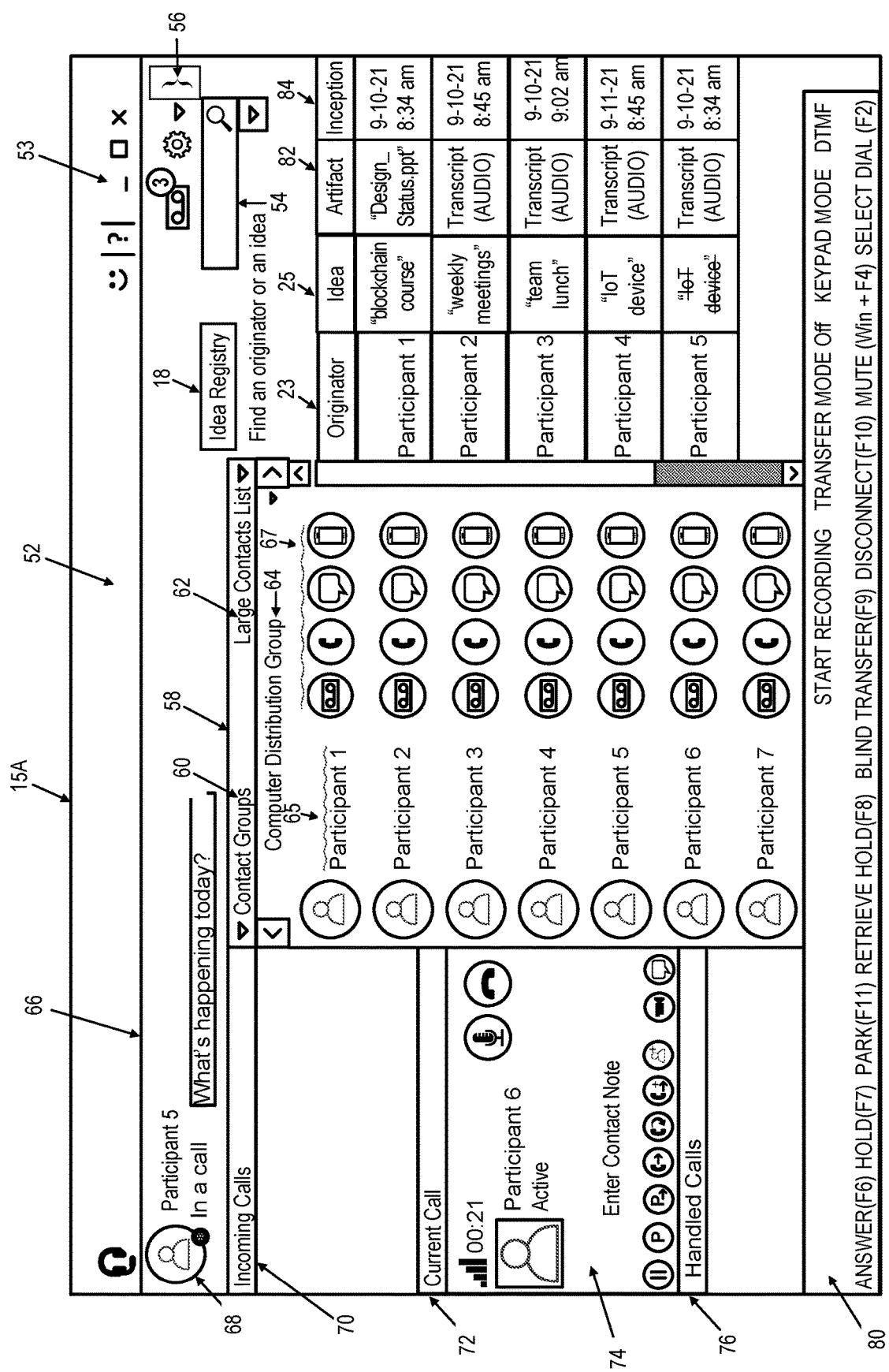
FIG. 4 illustrates a screen showing dynamic status based on detected subject matter in accordance with exemplary embodiments of this disclosure.

FIG. 4 shows an alternate screen (15A) that may be used with a system or method according to this disclosure. Screen (15A) could be the host/facilitator screen or could be available on one or more of participant devices (PD1-PD8). Screen (15A) is merely representative. More or less information may be shown on screen (15A), the information may be organized differently, or screen (15A) may not be used, in which case this description further defines the operation of a system and method of this disclosure.

Screen (15A) has a standard upper control bar (52) with known commands (53). Display (66) is the dashboard for either a participant or a conference host/facilitator. Display (66) provides an indication (68) of the activities of one or more of the conference participants. In this example, participant 5 is an a phone call during the conference.

Window (70) shows incoming calls, and if one was incoming, the name and phone number of the caller. Window (72) shows information related to a current call and in this case the user (either a participant or host/facilitator) is on a call with participant 6 and the call has lasted for 21 seconds. The user of the device showing screen (15A) has standard phone command options to place the call on or off speaker and to enter various contact notes.

Window (76) shows previously-handled calls and in this case name are shown. Window (80) is a lower bar with standard commands. Commands (56) are standard and box (54) is to search screen (15A).

Window (58) shows contact groups for the user and in the embodiment shown has Contact Groups (60, Large Contacts List (62), and a Computer Distribution Group (64). The Computer Distribution Group (64) includes conference participants 1-7, in this example, and commands (67) related to each participant, such as record, call, text (or chat), and delete.

Idea registry (18) was previously described and in this case is expanded. Column (23) shows idea Originators, column (25) shows ideas, column (82) shows artifacts, which is the information used to determine which participant was the idea originator, and column (84) shows the date of inception of the idea.

In this example, participant 1 is identified as the originator of the idea "blockchain course" as determined by a "Design Status.ppt" document on Sep. 10, 2021 at 8:34 am. Participant 2 is identified as the originator of the idea "weekly meetings" as determined by an audio transcript dated Sep. 10, 2021 at 8:45 am. Participant 3 is identified as the originator of the idea of "team lunch" as determined by an audio transcript dated Sep. 10, 2021 at 9:02 am. Participant 4 is identified as the originator of the idea "IoT device" as determined by an audio transcript dated Sep. 11, 2021 at 8:45 am. Participant 5 had originally been identified as the originator of the idea "IoT device" based on an audio transcript dated Sep. 10, 2021 at 8:34 am, but has been removed as the originator by system (10) based on an analysis by system (10) of the contribution of participant 4 versus that of participant 5.

FIG. 5 is an enlarged view of a screen according to this disclosure, which shows four conference participants (36), which are a subset of the participants (36) of FIG. 3. Column (85) shows the dynamic status of each of the four participants. Participant 1 is Reviewing a Github website on Python for Blockchain Developers. Participant 2 has no dynamic status and is doing nothing at that time to create or change his/her status. Participant 3 is searching on Blockchain algorithms. Participant 4 has no dynamic status and is doing nothing at that time to create or change his/her status.

OTHER APPLICATIONS

The disclosed system and method could be applied in circumstances in which subjective bias is a common problem because soft-spoken people in a conference may not receive credit for ideas. As another example, during negotiations in which an arbitrator must refer to an objective measurement to resolve the contributions of each participant in a conference, such as a union/employer conference, product development, organizational structure, or other conference, the system and methods herein can assign points for a participant who suggested an idea and/or who added the most qualitatively or quantitatively to an idea or topic.

The proposed system and method could also be extended to phone applications, wherein the participants involved in the conversation might receive status indicators as it relates to the conversation underway. For example, participant A speaking to participant B may talk about cricket scores. Participant C may then see an update on his/her participant device screen that shows participant B's activity dynamically updated to "Participant B is searching "Best website for cricket scores." Privacy filters would be similar to existing measures in place for sharing content with certain people and avoiding certain topics such as Google search settings.

In air traffic control situations, the traffic-control tower could receive dynamic updates as it relates to the activities within the airplane cockpit such as the actions of a pilot while they are communicating. For example, "Pilot Camden has adjusted her trim control."

The features of the various embodiments may be stand alone or combined in any combination. Further, unless otherwise noted, various illustrated steps of a method can be performed sequentially or at the same time, and not necessarily be performed in the order illustrated. It will be recognized that changes and modifications may be made to the exemplary embodiments without departing from the scope of the present invention. These and other changes or modifications are intended to be included within the scope of the present invention, as expressed in the following claims.

What is claimed is:

1. A conferencing system for determining a participant's status during a conference, the conferencing system comprising:
    a conference server configured to identify a participant and topics on which the participant comments based on data entries by the participant into a participant device assigned to the participant;
    one or more participant devices in communication with the conference server, wherein each participant device is assigned to a unique participant and wherein the one or more participant devices includes the participant device;
    a natural language processing (NLP) processor in communication with the conference server, wherein the NLP processor is configured to identify the participant and one or more topics on which the participant comments based on the participant's speech;
    a topics database in communication with the conference server and with the NLP processor, wherein the topics database stores one or both of the participant's speech and the participant's data entries made during the conference; and
    a ranking engine in communication with the topics database, wherein the ranking engine is configured to identify one or both of (a) whether the participant was an originator of an idea, and (b) the participant's relative rank in contribution to a topic;
    wherein one or both of the conference server and the NLP processor are further configured to filter out false positive comments about the topic.

2. The conferencing system of claim 1 that further includes one or more cameras in communication with the conferencing server, wherein the one or more cameras are in communication with the conferencing server and the conferencing server is further configured to identify the participant based on the participant's appearance.

3. The conferencing system of claim 1, wherein the topics database further stores the starting time and duration of the one or both of the participant's speech and the participant's data entries made during the conference.

4. The conferencing system of claim 1, that further includes one or more microphones in communication with NLP processor, wherein the one or more microphones are configured to receive and transmit the participant's speech to the NLP processor.

5. The conferencing system of claim 1, wherein one or both of the NLP processor and the conference server is further configured to identify one or both of synonymous and semantically-similar (a) words, and (b) phrases.

6. The conferencing system of claim 1, wherein one or both of the NLP processor and the conference server is further programmed to translate words from one language into another language.

7. The conferencing system of claim 1, wherein the conference server is further configured to determine a participant's contribution to the topic by analyzing the content and length of one or both of the participant's speech and data entries.

8. The conferencing system of claim 1, wherein the conference server directs at least one of the one or more participant devices to display one or both of the name and image of the originator when the originator's idea is discussed.

9. The conferencing system of claim 1, wherein the topics database further stores the starting time and duration of each occurrence of at least one of the one or both of the participant's speech and the participant's data entries.

10. A method for determining a participant's status during a conference, the method comprising:
    identifying by a conferencing server a participant and topics on which the participant comments based on data entries by the participant in a participant device assigned to the participant;

identifying, by a natural language processing (NLP) processor in communication with the conference server, the participant and topics on which the participant comments based on the participant's speech;

storing one or both of the participant's speech and the participant's data entries in a topics database that is in communication with the conference server;

determining, by utilizing a ranking engine in communication with the topics database, one or both of (a) whether a participant was an originator of an idea, and (b) the participant's relative rank in contribution to a topic based on analyzing the content and length of one or both of the participant's speech or data entries; and the conference server identifying inconsistencies in the ranking engine identifying the originator of a topic, wherein the inconsistencies include stated ownership of the idea by participants other than the originator of the idea.

11. The method of claim 10 that further includes the step of the conference server communicating one or both of the name and image of the originator of the idea to at least one of the one or more participant devices when the idea is being discussed.

12. The method of claim 10 that further includes the step of saving, in a memory in communication with the conference server, one or both of (a) the originator of at least one idea, and (b) the participant's relative rank in contribution to a topic.

13. The method of claim 10, wherein the conference server alerts at least one of the one or more participant devices when an inconsistency from the conference topic is detected.

14. A conferencing system for determining a participant's status during a conference, the conferencing system comprising:

a tangible, non-transitory memory configured to communicate with a conference server, wherein the tangible, non-transitory memory comprises instructions stored thereon that, in response to execution by the conference server, cause the conference server to at least identify a participant and topics on which the participant comments based on data entries by the participant in a participant device assigned to the participant;

one or more participant devices in communication with the conference server, wherein each of the one or more participant devices is assigned to a unique participant and the one or more participant devices includes the participant device assigned to the participant;

a natural language processing (NLP) processor in communication with the conference server, wherein the NLP processor is configured to identify the participant and topics on which the participant comments based on the participant's speech;

a topics database in communication with the conference server and the NLP processor, wherein the topics database stores one or both of the participant's speech and the participant's data entries made during the conference; and a ranking engine in communication with the topics database, wherein the ranking engine is configured to identify which participant was the originator of an idea;

wherein one or both of the conference server and the NLP processor are further configured to filter out false positive comments about the topic.

15. The conferencing system of claim 14, wherein the conference server and the NLP processor are each further programmed to identify synonymous and semantically-similar terms.

16. The conferencing system of claim 14, wherein the ranking engine is further configured to identify the length of time the participant spoke about and sent data about the topic.

17. The conferencing system of claim 14, wherein the ranking engine further provides dynamic status updates based on one or both of the speech and data being used during the conference to identify the originator of the idea each time the idea is discussed.

* * * * *